United States Patent [19]
Nagaura

[11] Patent Number: 5,935,731
[45] Date of Patent: Aug. 10, 1999

[54] CYLINDRICAL BATTERY

[75] Inventor: Toru Nagaura, Fukuoka, Japan

[73] Assignee: Voltec Pte. Ltd., Singapore, Singapore

[21] Appl. No.: 08/975,079

[22] Filed: Nov. 20, 1997

[51] Int. Cl.[6] .................................................. H01M 2/08
[52] U.S. Cl. ........................... 429/174; 429/172; 429/185
[58] Field of Search ................................... 429/163, 164, 429/168, 171, 172, 174, 185

[56] References Cited

U.S. PATENT DOCUMENTS

| | | |
|---|---|---|
| 4,078,126 | 3/1978 | Lechevallier ............................. 429/166 |
| 4,533,609 | 8/1985 | Dey et al. ................................. 429/172 |
| 5,455,128 | 10/1995 | Tanaka ..................................... 429/163 |
| 5,580,679 | 12/1996 | Tanaka ..................................... 429/185 |

*Primary Examiner*—Stephen Kalafut
*Attorney, Agent, or Firm*—Kubovcik & Kubovcik

[57] ABSTRACT

A non-aqueous electrolyte battery wherein the battery element comprising a cathode, an anode and separator, is housed and sealed completely into a cylindrical metallic casing after being impregnated with electrolyte, and said battery is featured by that the opening of its casing is sandwiched between and closed by the insulating gasket placed at the internal surface, and the metallic reinforcement placed at the external surface.

4 Claims, 5 Drawing Sheets

CYLINDRICAL BATTERY

The invention relates to the structure of a non-aqueous electrolyte battery.

As exhaust gas emitted from automobiles is considered as one of the major causes of worsening of the global environment, a new Act of Exhaust Gas Regulation is going to take effect in California, U.S.A. from 1998. According to the Regulation, every automobile maker is required to abide by the rule that 2% of the total number of the automobiles sold should be electric vehicles emitting no exhaust gas at all. Since one of the essential technologies applied to electric vehicles is the secondary battery, and the battery performance, especially the battery energy density (wh/kg) determines the basic performance of automobiles such as the acceleration power and the traveling distance before recharging, users are waiting eagerly for the prompt development of secondary batteries with high energy density.

As for the development of a secondary battery with high energy density, there has long been research into the non-aqueous electrolyte secondary battery using lithium metal as its anode. However, along with the repeated charge-discharge cycle of the secondary battery, the lithium metal serving as the anode gradually becomes powder-like and thus loses the functions as an anode, so that a sufficiently long cycling life can not be attained.

Nevertheless, it has been discovered that great improvement of the battery cycling life can be achieved by replacing lithium metal with carbon material or lithium titanium oxide as the active anode material. The non-aqueous electrolyte secondary battery, with the reaction of lithium-ion intercalation into active anode material, has been developed and finally has reached the stage of practical application. Successfully put into practical use for the first time by the inventor and others the battery was introduced Into the world in 1990 under the name of "lithium-ion secondary battery" (See Progress in Batteries & Solar Cells, Vol.9, 1990, p.209). They are currently recognized as "the next generation secondary batteries", and rapidly being adopted as energy sources in products such as mobile phones, video cameras, note-book computers, etc.

It was the first generation of the invented lithium-ion secondary battery that was produced by impregnating the battery element (which was formed by winding up an anode containing coke as active anode material and a cathode containing lithium cobalt oxide ($LiCoO_2$) as active cathode material, with a porous film inserted between the said anode and cathode as separator) with electrolyte, housing the battery element into a the nickel-plated iron battery casing, then caulking and sealing completely the external periphery of the opening of the battery casing. Recently the lithium-ion secondary battery, with graphite as its active anode material and lithium nickel oxide ($LiNiO_2$) or lithium manganese oxide ($LiMn_2O_4$) as its active cathode material, has been produced experimentally and some have been made into practical products.

The energy density (wh/kg) of the aforementioned lithium-ion secondary batteries is approximately twice as much as that of conventional secondary batteries; and its weight is only half of that of the conventional secondary batteries based on the same amount of energy storage.

However, with regard to electric vehicle batteries, they are expected to be even much lighter because an electric vehicle requires a large number of cells for obtaining a vast amount of driving force.

In order to reduce the weight of batteries, one of the methods is to lessen the weight of battery containers. In the cases of nickel cadmium secondary battery and nickel hydride secondary battery with an alkaline solution as electrolyte, when the batteries are under charging, the internal pressure of the batteries increases together with the decomposition of the electrolyte even under the normal conditions. Accordingly the battery containers must be strong enough to bear the increasing internal pressure. But in the case of non-aqueous electrolyte secondary battery, normally the internal pressure does not increase, and hence makes it possible to decrease the thickness of the wall of the battery container (casing) so as to reduce the weight of the battery. However it the wall of the battery casing is thinned, the external periphery of the opening part of the battery casing, which will be caulked and sealed completely, may not be strong enough to sustain the caulking force and the battery air-tightness may be affected. As a result, the battery in a bad preservation state can not be used for a long period.

Moreover, light material such as aluminum may be adopted as the battery casing material for the non-aqueous electrolyte secondary battery. Although aluminum is the typical material for making battery casings of light material, in comparison with the conventional iron or stainless battery casing, an aluminum casing is inferior in terms oat sustaining the caulking force. As a result, sufficient air-tightness can not be attained, thus the battery performance can not be maintained in a long period. As such, the aluminum casing has not been considered as a battery container. On the other hand, when connecting the lead between battery and circuit, instead of soldering the lead directly to the battery, a tab is welded onto both the battery cap and the battery casing, then the lead is welded to the tab, so as to avoid giving excessive heat to the battery. However, the weak welding strength between an aluminum casing and a tab, as well as low reliability of the tab welding make it difficult to adopt aluminum casings as battery containers.

With the aim to increase the energy density by means of lightening the battery container, the methods mentioned above might cause problems such as lowering the battery air-tightness, worsening the preservation of battery performance etc.

Aiming to increase the energy density (wh/kg) of the non-aqueous electrolyte battery, with the utilization of thin casings or aluminum casings, an object of the present invention is to provide closing technology which is applied at battery casing opening and which can achieve sufficient air-tightness so as to ensure long-term maintenance of the battery performance.

To solve the aforementioned problem, the measure based on this invention is to strengthen the external periphery of the closed part of the battery casing with metallic reinforcement.

FIG. 2 shows a cross-section of a conventional battery with the iron battery casing (4) and its casing opening (5) being caulked inward and closed In this case, the external periphery of the casing is caulked with a plastic gasket (3) sandwiched between the closing cap (9) and the casing opening (5), then the gasket (3) is tightened and the battery is sealed completely. As the air-tightness is largely determined by the tightening strength applied to the gasket, the wall thickness of the iron casing is certainly a critical factor. The conventional battery with the iron-casing wall of over 0.25 mm in thickness can attain air-tightness high enough to maintain battery performance. Nevertheless, even in the case that an iron casing is used, when the casing thickness is below 0.25 mm, it is still difficult to achieve satisfactory air-tightness. Furthermore, if the iron casing is replaced with an aluminum casing, since aluminum is softer than iron, the tightening strength of the gasket is smaller, thus satisfactory air-tightness can not be attained.

FIG. 1 shows a cross-section of the battery based on this invention. Casings with thin wall or aluminum casings are adopted in this battery; with the metallic (irons stainless etc.) reinforcement (2), the external periphery of the closed part is strengthened; the external periphery of the casing, together with the reinforcement is caulked and closed. As shown in FIG. 1 since a casing with thin wall or a casing made of light material such as an aluminum casing is adopted, the weight of the battery becomes less. Meanwhile since the external periphery of the closed part of the battery casing is strengthened by the reinforcement (2), the tightening strength of the gasket can reach as high as or even higher than that of a conventional battery. Therefore, based on this invention the air-tightness of the battery casing can be guaranteed to reach the same level of that of a conventional battery, while the energy density (wh/kg) of the lithium-ion secondary battery can be further enhanced.

In the figures, 1 is battery element, 2 reinforcement, 3 gasket, 4 battery casing, 5 battery casing opening, 6 anode lead, 7 cathode lead, 8 explosion-proof valve, 9 closing cap, 10 striation.

This invention is to be explained in further detail with the examples below.

Example 1

Figure 1:
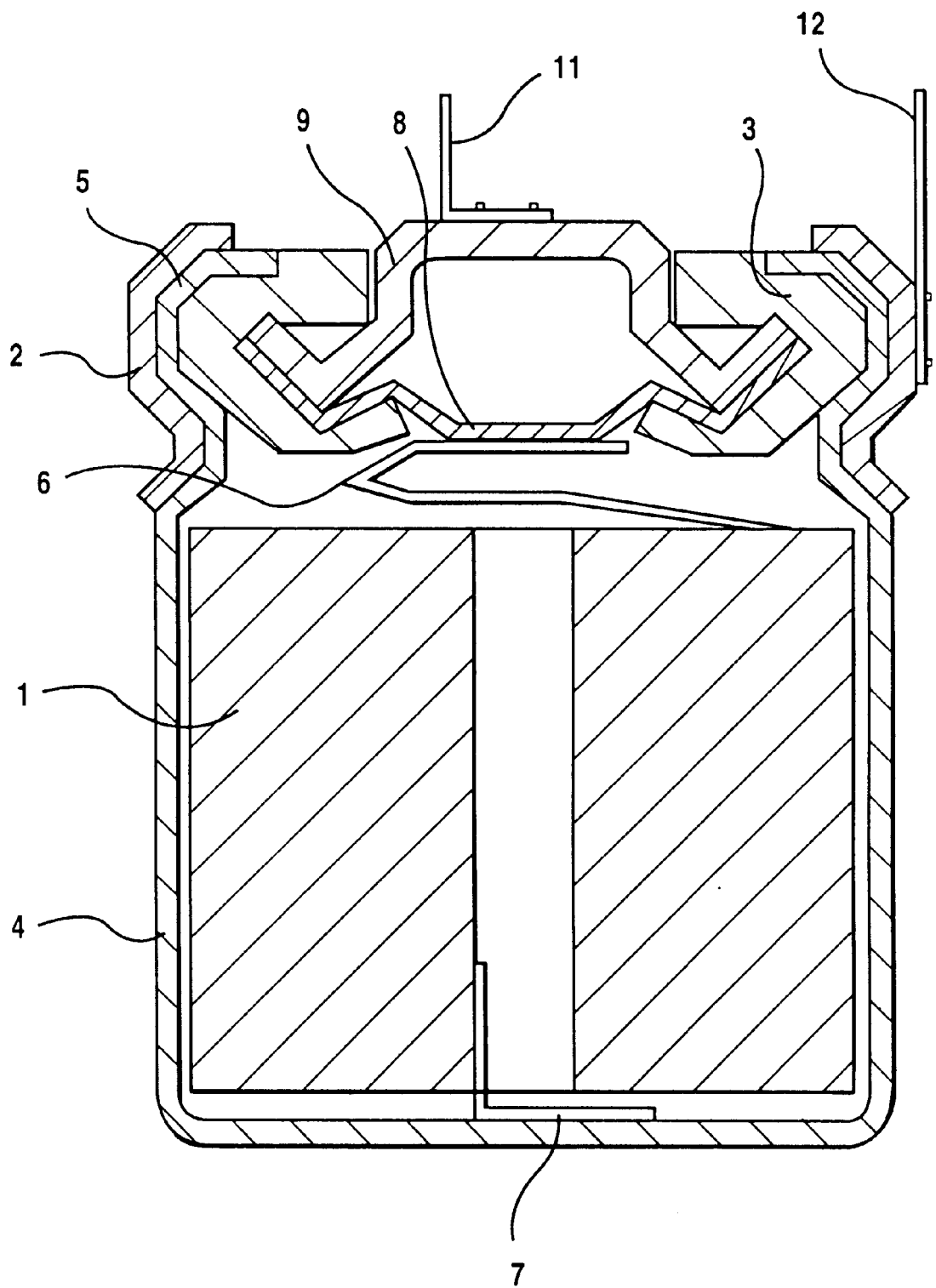
FIG. 1 shows a typical cross-section of the battery based on this invention.
Figure 2:
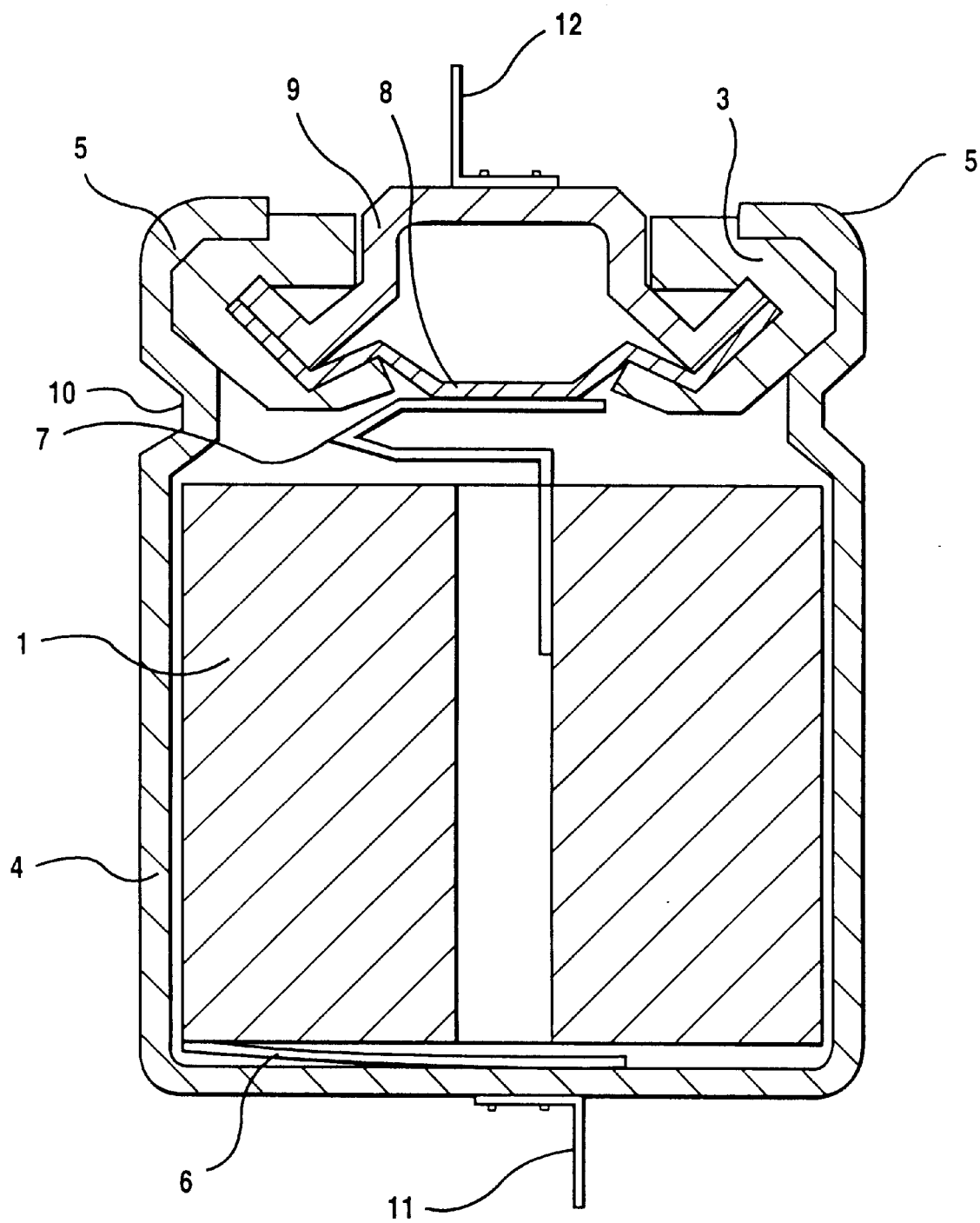
FIG. 2 shows a typical cross-section of the conventional battery.

The battery based on this invention is illustrated with reference to FIG. 1, FIG. 2 and FIG. 4. Firstly mix 88 parts by weight of meso-carbon microbeads (d002=3.36 Å) which has been heat treated at 2800° C., with 2 parts by weight of acetylene black. Then wet mix with the solution (N-methyl-2-pyrrolidone) into which 10 parts by weight of polyvinylidene fluoride (PVDF) has been dissolved as a binding agent to form a slurry (a paste). Apply this slurry evenly onto the both sides of copper foil of anode current collector, dry the coated copper foil, and then subject it to pressurized casting with a roll press to form a strip-shaped anode.

Weigh lithium carbonate and manganese dioxide so that the atom ratio of lithium and manganese is Li/Mn=0.53, mix them, heat-treat the mixture for 12 hours in air at a temperature of 850° C. to form lithium manganese compound oxide.

Well mix 89 parts by weight of the prepared lithium manganese compound oxide with 3 parts by weight of acetylene black, 4 parts by weight of graphite and 4 parts by weight of polyvinylidene fluoride, then wet mix with N-methyl-pyrrolidone to form a slurry. Apply this slurry evenly onto the both sides of aluminum foil which functions as cathode current collector, dry the coated aluminum foil, then subject it to pressurized casting with a roll press to form a strip-shaped cathode.

After inserting a porous polypropylene separator between the prepared cathode and anode, wind them into a roll shape to make an electrode element (also called battery element) (1) with an average external diameter of 15.7 mm.

Figure 3:
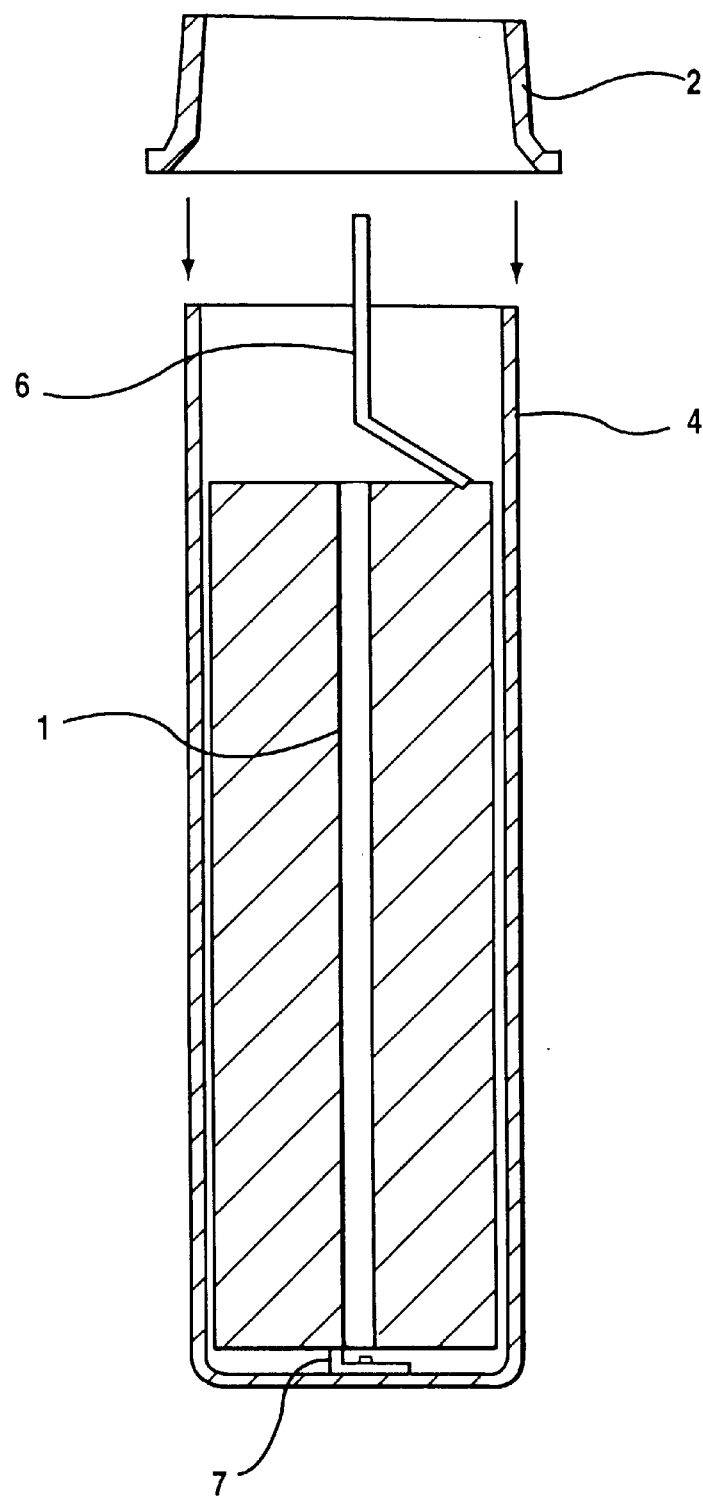
FIG. 3 shows a placement of reinforcement at the external periphery of the battery casing.
Figure 4A:
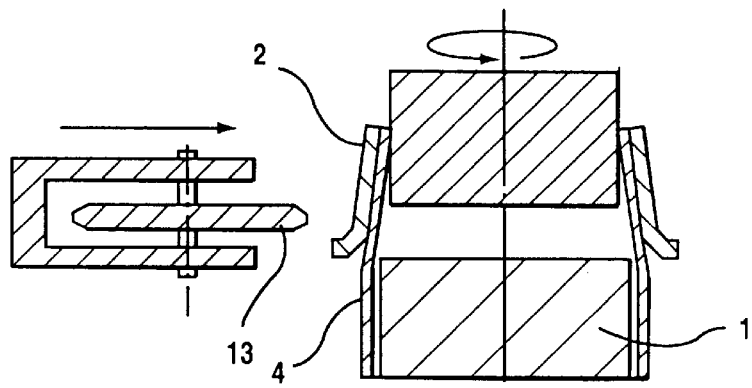
FIGS. 4(a)–4(d) show a process of closing the battery casing.
Figure 4B:
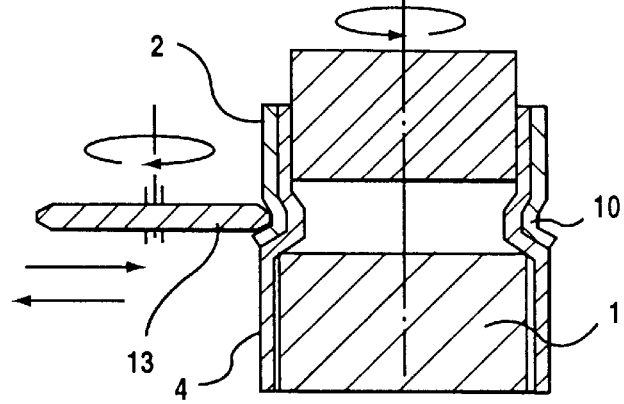
Figure 4C:
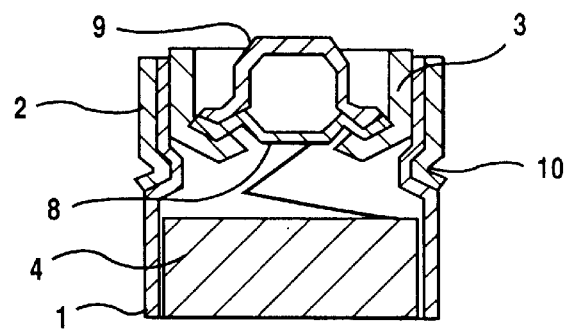
Figure 4D:
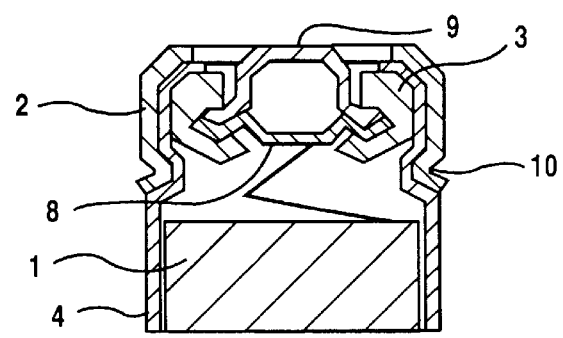

As shown in FIG. 3, house the prepared battery element (1) into the aluminum battery casing (4) with a wall thickness of 0.2 mm, weld the cathode lead (7) taken out from the battery element to the base of the battery casing. Then fit the ring-shaped iron reinforcement (2) with wall thickness of 0.3 mm to the external side of the battery casing opening. After that as shown in FIG. 4 (a), while rotating the battery casing in the direction of the arrow, press the metallic disc (13) onto the battery casing. As shown in FIG. 4 (b), squeeze the battery casing (4) together with the reinforcement inward, and leave the striation (10) on both the battery casing (4) and the reinforcement (2). Then insert the gasket and place it at the internal side of the battery casing, weld the explosion-proof valve (8) to the anode lead. Inject the electrolyte, place the explosion-proof valve (8) inside the battery as shown in FIG. 4 (c), put the closing cap (9) which is to be the anode external terminal on the top of the explosion-proof valve, and caulk the brim of the battery casing. By then the battery (A) with the battery structure shown in FIG. 4(d) and FIG. 1 is completed.

19.88 g in weight, the battery (A) based on this invention is much lighter than a conventional battery.

Finally fit the anode tab (11) and cathode tab (12), which serve the purpose of soldering the lead onto the battery (A), onto the closing cap (9) and iron reinforcement (2) respectively by means of spot welding. Due to the weak spot welding strength between the aluminum casing and the tab, and the low reliability of the tab welding, it is one of- the concerns about adopting an aluminum battery casing. However, the battery based on this invention can resolve the problem by means of spot welding the cathode tab onto the reinlorcement (2).

Comparison Example 1

The conventional battery is made as illustrated below.

House the battery element (1), which is prepared in the same way as described in Example 1, into the iron battery casing (4) with the casing wall of 0.3 mm in thickness. Weld the anode lead (6), which is taken out from battery element, onto the base of the battery casing; while rotating the battery casing, press the metallic disc onto the battery casing. Squeeze the battery casing (4) and leave the striation (10) as shown in FIG. 2. After that, insert the gasket (3) and place it at the internal side of the battery casing, weld the cathode lead onto the aluminum explosion-proof valve (8). Inject the electrolyte into the battery casing, place the explosion-proof valve (8) inside the battery. Then put the closing cap (9) which is to be the cathode external terminal on the top of the explosion-proof valve, and caulk the brim of the battery casing. The battery (B) with the battery structure as shown in FIG. 2 is completed.

The conventional battery (B), 24.3 g in weight, is 22% heavier than the battery (A) made in Example 1. Lastly fit the anode tat (11) and cathode tab (12), which serve the purpose of soldering the lead onto the battery (A), on the base of the battery casing and the closing cap (9) by means of spot welding. As the conventional battery adopts either an iron casing or a stainless casing, it is not a problem to spot weld the tab onto the battery casing.

Comparison Example 2

The battery made in this Comparison Example 2 differs from the one made in Example 1, for in this battery no reinforcement is added. The battery made in this Comparison Example 2 also differs from the conventional battery, because instead of an iron battery casing, an aluminum battery casing is adopted.

House the battery element (1) that is formed in the same way as that of Example 1 into the aluminum battery casing with the casing wall of 0.3 mm in thickness. In the same manner as described in Comparison Example 1 of Conventional Battery, while rotating the battery casing, press the metallic disc onto the battery casing. Squeeze the battery casing inward and leave the striation. Then follow the same procedures as described in Comparison Example 1 to produce the battery (C). 20.02 g in weight, the battery (C) is considerably light just like battery (A), because both adopt the aluminum for the battery casings. In comparison with battery (B), the battery is 17.4% lighter only by adopting aluminum for the battery casing.

Energy Density of the Batteries

Set the charging voltage at 4.2 V, charged the batteries (A), (B) and (C) obtained for 4 hours at a current of 500 mA, then discharged them at a current of 500 mA to a cut-off voltage of 3.0 V. Batteries (A), (B) and (C) all attained an average discharged voltage of 3.7 V and an average discharged capacity of 700 mAh. Following the formula [discharged capacity]×[average discharged voltage]÷[battery weights], the energy densities of batteries (A), (B) and (C) were calculated. The energy density of the conventional battery (B) is 106.6 wh/kg, while the energy densities of batteries (A) and (C) both with aluminum battery casings are 130.3 wh/kg and 129.4 wh/kg respectively. It is apparent that the energy density has been greatly increased.

Storage Test of the Batteries

Once again set the charging voltage at 4.2 V, charged batteries (A), (B) and (C) for 4 hours at a current of 500 mA. After the weight and the internal resistance of these batteries were measured, kept them in an oven at a temperature of 45° C. for 30 days. Then measured again the weight and the internal resistance of these batteries to see the weight loss of the batteries as well as the change in the internal resistance of these batteries during the storage period. As a result, the weight loss of both battery (A) and battery (B) is 1 mg, while the internal resistance of the both is almost maintained at their original value (approximately 50 milliohm) However, in the case of battery (C), the weight loss is as high as 180 mg and the internal resistance has increased 90 milliohm. Accordingly, since it is an aluminum casing not an iron casing adopted in battery (C), its energy density has been increased. But on the other hand, as aluminum is softer than iron, the tightening strength of the gasket becomes smaller, and satisfactory air-tightness can not be attained. As such, the electrolyte inside slips out gradually during the long-term storage and the internal resistance goes up.

In the case of the battery based on this invention, as the external periphery of the casing is caulked and closed with metallic (iron, stainless etc.) reinforcement (2) at the external periphery of the battery closed part, the tightening strength of the gasket can reach as high as or even higher than that of a conventional battery, even a casing with thin wall or a casing made of light material such as aluminum is adopted. Accordingly, the battery based on this invention can enjoy an increased energy density (wh/kg); meanwhile its long-term storage can be as good as or even better than that of a conventional battery.

Figure 5A:
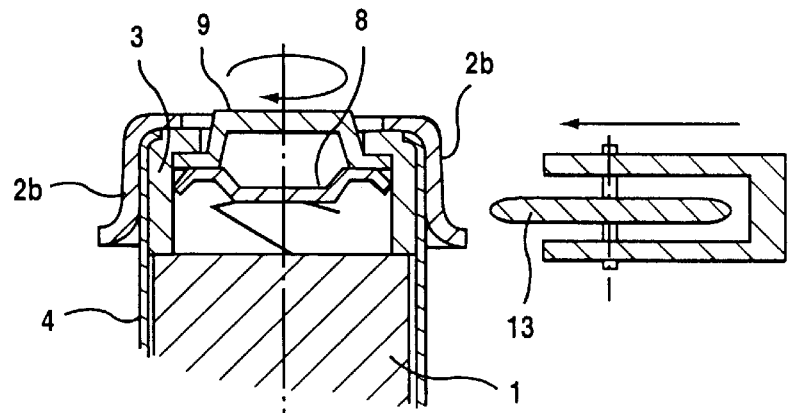
FIGS. 5(a)–5(c) show a typical cross-section of the battery based on this invention.
Figure 5B:
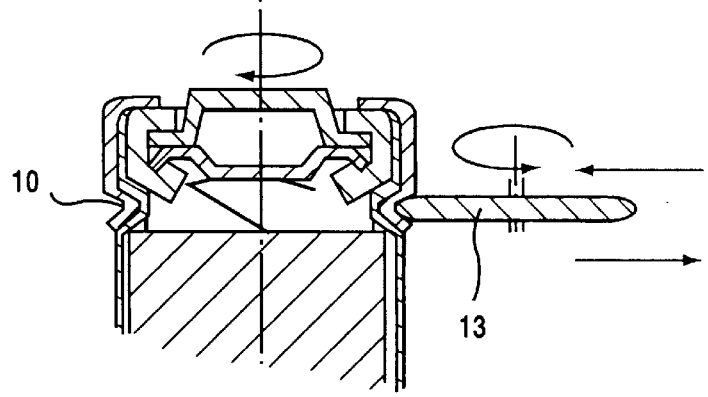
Figure 5C:
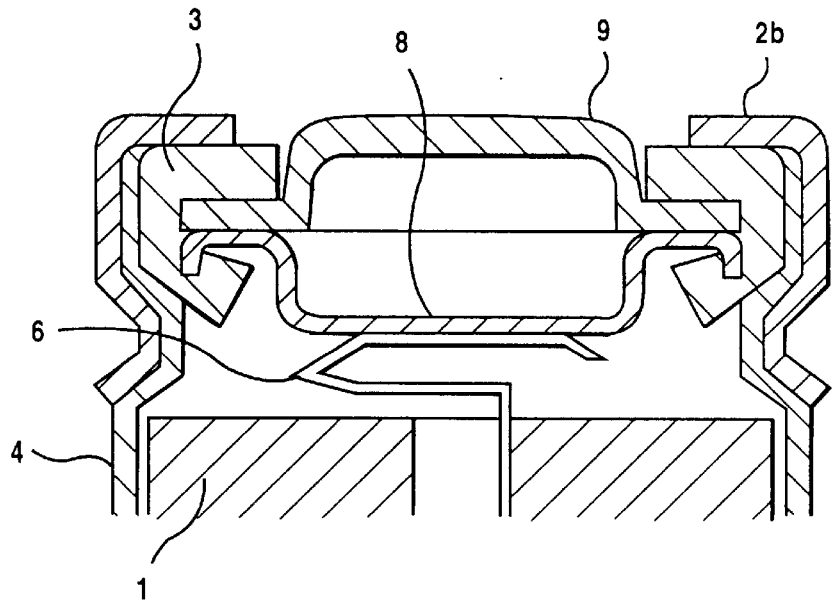

The application of this invention is not only limited to the closing method, shape of the reinforcement and the material as shown in Example 1. To use the reinforcement (2b) with the shape as shown in FIG. 5, and follow the process as shown in FIG. 5 (a) and (b), the battery with the cross-section of the closed part as shown in FIG. 5 (c) can be produced.

Although Example 1 shows the production of a lithium-ion secondary battery with lithium manganese oxide as it's active cathode material and carbon material as its active anode material, based on this invention other types of non-aqueous electrolyte batteries, both secondary batteries and primary batteries, can also be produced.

The sufficient air-tightness of the battery based on this invention can be guaranteed because the battery casing opening is sandwiched between and closed by insulating gasket placed at the internal side and the metallic reinforcement placed at the external side. Therefore, by adopting the light material like aluminum etc. for a battery casing, the non-aqueous electrolyte secondary battery with high energy density (wh/kg) to serve a long life can be realized.

In consequence, the lithium-ion secondary battery, which can even be used as power sources for electric vehicles, is of tremendous industrial value because it helps to slow down the deterioration of global environment caused by exhaust gas emitted from automobiles.

What is claimed is:

1. A non-aqueous electrolyte battery comprising a cylindrical metallic casing and, housed and sealed completely therein as a battery element, a cathode, an anode and separator, said casing having an opening at an end thereof wherein an external periphery of said casing is sandwiched between and closed by an insulating gasket placed at an internal surface, and a metallic reinforcement placed at an external surface.

2. The battery as defined in claim 1 wherein the battery casing is made of aluminum or aluminum alloy.

3. The battery as defined in claim 1 wherein all electrical connection between the battery casing and all external circuit is established through the metallic reinforcement placed at the external periphery of the closed part of the battery casing.

4. The battery as defined in claim 2 wherein an electrical connection between the battery casing and the external circuit is established through the metallic reinforcement placed at an external periphery of the closed part of the battery casing.

* * * * *